United States Patent [19]

Motomura et al.

[11] Patent Number: 4,512,449
[45] Date of Patent: Apr. 23, 1985

[54] FRONT COVER FOR A TORQUE CONVERTER AND METHOD OF PROCESSING THE SAME

[75] Inventors: Jiro Motomura, Anjo; Yasuhisa Kamiya, Chita; Seiichi Nishikawa, Ioyokawa, all of Japan

[73] Assignee: Aisin Warner Kabushiki Kaisha, Aichi, Japan

[21] Appl. No.: 346,212

[22] Filed: Feb. 5, 1982

[30] Foreign Application Priority Data

Feb. 10, 1981 [JP] Japan .................... 56-18303

[51] Int. Cl.³ .................. F16H 45/02; F16D 3/12
[52] U.S. Cl. ........................ 192/3.28; 72/124
[58] Field of Search .......... 192/3.28, 3.29, 3.3, 192/3.31, 70.14, 107 R, 107 M; 188/251 M; 60/330; 72/124

[56] References Cited

U.S. PATENT DOCUMENTS

| 2,254,289 | 9/1941 | Jensen | 72/124 |
| 2,294,324 | 8/1942 | Wilkens et al. | 72/124 |
| 4,353,444 | 10/1982 | Bionaz | 192/3.29 |
| 4,422,538 | 12/1983 | Krumm | 192/70.14 |

FOREIGN PATENT DOCUMENTS 0273681 6/1970 U.S.S.R. .................... 72/124

Primary Examiner—George H. Krizmanich
Attorney, Agent, or Firm—Koda and Androlia

[57] ABSTRACT

A front cover affixed to the pump impeller of a torque converter, provided with a flat annular flat annular surface to be engaged with the clutch disk of a direct-coupling clutch formed within the torque converter.

The flat annular surface is formed in a flat and annular surface having a hard and compact metallographic structure by rolling a rolling tool made of a extremely hard material on the flat annular surface under a pressure and by thus causing plastic deformation of the flat annular surface. An intermediate part of an arcuate section of a small radius is formed between the periphery of said flat annular surface and a connecting part adjacent to the flat annular surface.

2 Claims, 3 Drawing Figures

FRONT COVER FOR A TORQUE CONVERTER AND METHOD OF PROCESSING THE SAME

BACKGROUND OF THE INVENTION

The torque converter comprises a pump impeller, a turbine runner and a stator supported in a one-way clutch. The pump impeller is connected to the output shaft of an engine through a front cover concentrically fixed to the pump impeller, while the turbine runner is connected to the input shaft of a transmission gear.

In an automatic transmission for a motor vehicle, a direct-coupling clutch is included in the torque converter for directly connecting the output shaft of the engine and the input shaft of the transmission gear. For this purpose, a clutch disk is mounted axially slidably on the input shaft of the transmission gear and is adapted to be rotatable together with the turbine runner in the space formed between the front cover and the turbine runner, while a flat surface is formed on the front cover for affixing a frictional material or for frictionally engaging with a frictional material. The output shaft of the engine and the input shaft of the transmission gear are directly connected by the frictional engagement of the clutch disk and the front cover through the frictional material.

It is desirable to provide either the front cover or the clutch disk with a frictional material of an increased diameter and of a flat surface and to make the entire area of the frictional material to be in contact with the counterpart when the direct-coupling clutch is engaged in order to provide an increased capacity of torque transmission for the direct-coupling clutch.

Generally, the front cover is manufactured by means of press forming in order to achieve improved productivity and reduced manufacturing cost and also the front wall portion of the front cover disposed opposite to the clutch disk and the peripheral portion of the front cover for securely joining with the pump impeller shell are connected by a curved connecting portion of a considerably large radius of curvature in order to assure the sufficient strength of the front cover. Therefore, it is extremely difficult to provide a frictional material of an increased outside diameter without increasing the outside diameter of the front cover when the front cover is manufactured by means of press forming.

SUMMARY OF THE INVENTION

Generally speaking, in accordance with the present invention, a front cover of a torque converter which is capable of constructing a direct-coupling clutch of an increased outside diameter without any additional increase in the outside diameter of the torque converter is provided.

The front cover of the present invention is formed by pressing a metal plate and consists of a front wall portion having a flat and annular surface to which an annular frictional material is affixed or which engages with a frictional material, a cylindrical peripheral portion which is formed by bending the periphery of the front wall portion substantially perpendiculary to the front wall portion and which has an end portion to be securely joined with the pump impeller shell of the torque converter, and a connecting portion having a section of an arc of a circle and connecting the front wall portion and the cylindrical peripheral portion. The annular surface of the front wall portion and a part of the connecting portion include a part compressed in the direction of the thickness of the front wall portion and having a surface of compact metallographic structure. This compact metallographic structure is formed by rolling a rolling tool under pressure on the inside surface of the front cover. This rolling finish also contributes to increasing the outside diameter of the flat annular surface as well as to reducing the radius of curvature of the curve of the connecting portion.

Accordingly, it is an object of the present invention to provide a durable and highly reliable front cover which is to be affixed to the pump impeller of a torque converter.

Another object of the present invention is to provide a front cover to be affixed to the pump impeller of a torque converter and having a flat annular surface adapted to carry a frictional material of a direct-coupling clutch or to be engaged with the frictional material and formed in an increased outside diameter without increasing the outside diameter of the front cover.

Another object of the present invention is to provide a front cover to be affixed to the pump impeller of a torque converter, having a configuration of a drum comprising a front wall portion, a cylindrical peripheral portion, a curved connecting portion connecting the front wall portion and the peripheral portion and a boundary portion provided between the front wall portion and the connecting portion which is formed through rolling in the direction of the thickness of the front wall portion so as to increase the strength as well as to reduce the radius of curvature of the connecting portion, whereby a flat and annular surface for carrying a frictional material of the direct-coupling clutch or for engaging with the frictional material and of an increased outside diameter is formed without increasing the outside diameter of the front cover.

A further object of the present invention is to provide a method of processing facturing the front cover of a torque converter comprises the features of construction stated hereinbefore.

Still other objects and advantages of the invention will be in part be obvious and will in part be apparent from the following description.

BRIEF DESCRIPTION OF THE DRAWINGS

For a fuller understanding of the present invention, reference is had to the following description taken in connection with the accompanying drawings, in which.

DESCRIPTION OF THE PREFERRED EMBODIMENTS

The front cover for a torque converter and the method of processing the same will be described in detail hereinafter referring to the accompanying drawings.

Figure 1:
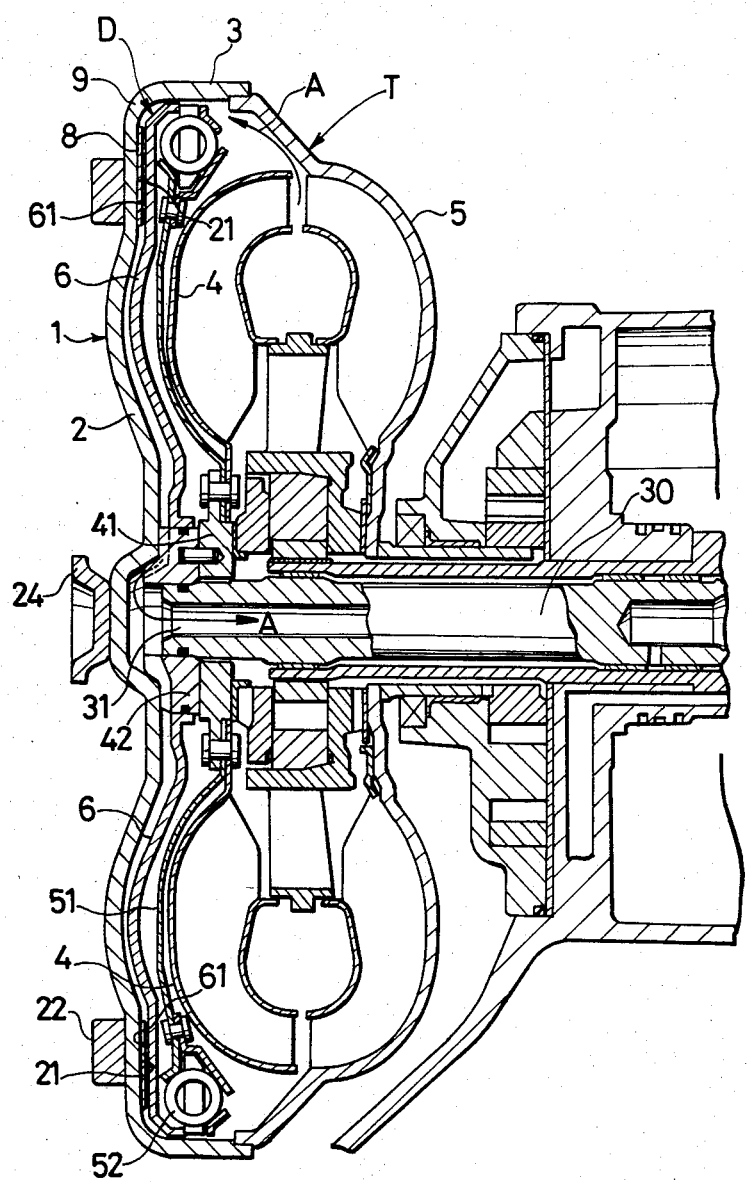
FIG. 1 is a sectional view of a torque converter equipped with a direct-coupling clutch.

FIG. 1 is a sectional view of a torque converter comprising a direct-coupling clutch and adapted to be incorporated into a vehicle automatic transmission. A torque converter and the front cover of the torque converter are generally indicated at a symbol T and a reference numeral 1 respectively. The front cover 1 is formed in a configuration of a drum comprising a front wall portion 2 of a disk-shape, a cylindrical peripheral portion 3 which is extending from the periphery of the front wall portion 2 substantially perpendicularly to the front wall portion 2 and a curved connecting portion 9 connecting the front wall portion 2 and the peripheral portion 3. A center guide 24 is welded to the front wall portion 2 at the central axis thereof. A plurality of mounting seats 22 are welded to the front wall portion 2 at the marginal portion thereof. The torque converter 1 is connected coaxially to the output shaft, not shown, of an engine by means of the mounting seats 22. The free end of the peripheral portion 3 is fixed to the flange of the pump impeller shell 5 of the torque converter T.

A direct-coupling clutch indicated generally at a symbol D is formed in a space between the front cover 1 and a turbine runner 4. The turbine runner 4 of the torque converter T is mounted fixedly on an output shaft 30 by means of the hub 41. The clutch disk 6 of the direct-coupling clutch D is mounted axially slidably on a center ring 42 fixed coaxially to the hub 41 at the front thereof. The clutch disk 6 is connected at the periphery thereof to a cushion plate 51 connected to the hub 41 through a spring 52. Accordingly, the clutch disk 6 is rotated together with the turbine runner 4 and when pressurized fluid is supplied into the torque converter T through the space between the turbine runner 4 and the pump impeller shell 5 and through the space between the front cover 1 and the clutch disk 6, then into the central bore 31 formed on the output shaft 30 and discharged from a drain port, not shown, as shown by an arrow A, the clutch disk 6 is pressed against the front cover 1.

A flat annular surface 21 of a predetermined area is formed on the inside surface of the front wall portion 2 of the front cover 1 near the periphery of the front wall portion 2 in a plane perpendicular to the axis of the output shaft 30 of the torque converter T. The clutch disk 6 also has a flat annular surface 61 of a diameter the same with that of the flat annular surface 21 and of a predetermined area formed on the surface thereof opposite to the flat annular surface 21. A flat annular frictional material 8 of a high coefficient of friction is interposed between the surfaces 21 and 61. The frictional material functions as means to frictionally connect the front wall portion 2 of the front cover 1 and the clutch disk 6 when the clutch disk 6 is pressed toward the front cover 1. In the embodiment as shown in FIG. 1, the frictional material 8 is affixed to the surface 21 of the front wall portion 2 and the surface 61 of the clutch disk 6 engages frictionally with the frictional material 8, however, in a modification, the frictional material 8 may be affixed to the surface 61 of the clutch disk 6, while the surface 21 of the front wall portion 2 may be adapted to engage frictionally with the frictional material 8.

It is preferable that the respective entire surfaces of the frictional material 8 and the flat annular surface 21 or the flat annular surface 61 are in contact when the frictional material 8 and the flat annular surface 21 or the friction surface 61 engage, therefore, a high flatness is required of the flat annular surface 21 and 61. Furthermore, in order to provide an increased capacity of torque transmission for the direct-coupling clutch, a highest possible flatness as well as a largest possible outside diameter are required of the flat annular surface 21 and 61.

However, since the front cover of this type is manufactured by pressing process due to the high productivity and the low manufacturing cost of the press forming process, the connecting portion 9 connecting the front wall portion 2 and the peripheral portion 3 is formed in a curved shape and, at the same time, the radius of curvature of the curve of the connecting portion 9 cannot be reduced below a certain value due to the technical restrictions of the press forming process as well as the requisite structural strength of the front cover. Accordingly, if the outside diameter of the flat annular surface 21 is increased simply in order to increase the capacity of torque transmission, the curved surface of the connecting portion 9 is inevitably included partially in the flat annular surface 21 so that at the flatness of the flat annular surface 21 is spoiled, or if a friction surface 21 of an increased outside diameter is necessary, the outside diameter of the front cover 1 must be increased, or the outside diameter of the flat annular surface 21 is limited within a certain value.

It may be possible to form a flat annular surface 21 of an increased outside diameter without increasing the outside diameter of the front cover 1 by removing the inner surface portion of the connecting portion 9 extending next to the friction surface 21 in level with the friction surface 21 or by reducing the radius of curvature of the connecting portion 9 in the pressing process, however, the machining of the connecting portion 9 will result in the reduction in the mechanical strength of the connecting portion 9 and the reduction in the radius of curvature of the connecting portion 9 will cause concentration of stress at the press forming of the connecting portion 9, thus in either cases, the durability and the reliability of the front cover is decreased.

The flat part of the front wall portion 2 and part of the connecting portion 9 of the front cover to be formed into the friction surface 21 are subjected to single point rolling process in which a rolling tool is pressed against the flat part and the part of the connecting portion 9 under a predetermined pressure while the rolling tool travels relatively to the front cover along the flat part and the part of the connecting portion 9 whereby the flatness of the rolled part is improved through plastic deformation and the metallographic compactness of the rolled surface increases. Furthermore, the single point rolling process provides a friction surface 21 of an increased outside diameter without increasing the outside diameter of the front cover 1 and also reduces the radius of curvature of the curved part of the connecting portion 9 extending next to the friction surface 21.

Figure 2:
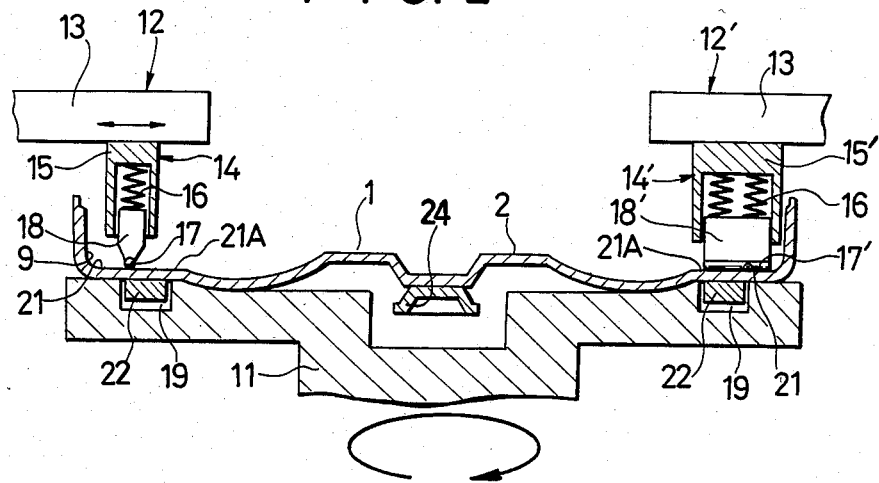
FIG. 2 is a schematic illustration, in section, of an embodiment of an apparatus suitable for carrying out the method of processing the friction surface of a front cover according to the present invention.
Figure 3:
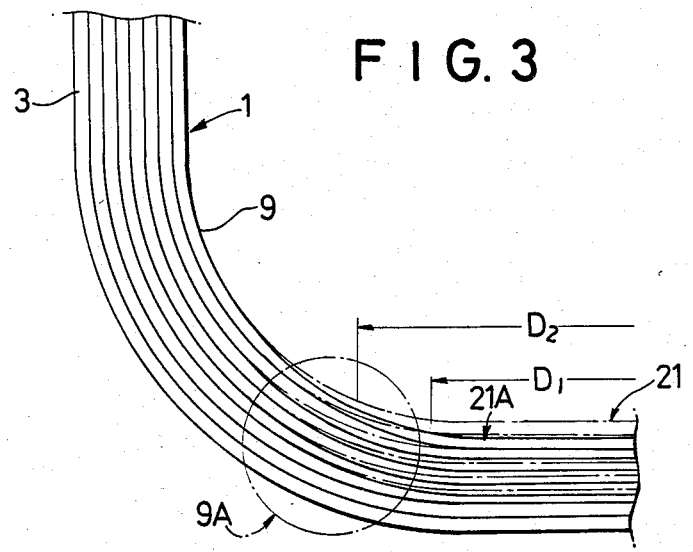
FIG. 3 is an enlarged sectional view of the connecting portion of a front cover embodied according to the present invention.

FIG. 2 is a schematic illustration of an apparatus for carrying out the method of the single point rolling. Referring to FIG. 2, a front cover 1 formed by press forming is placed concentrically on a rotary table 11 and correctly positioned on the rotary table 11 with the mounting seats 22 fitted in the corresponding grooves 19 formed on the rotary table 11. In FIG. 2, one exemplary rolling head 12 and another exemplary rolling head 12' are shown on the leftside and on the rightside respectively.

The rolling head 12 comprises an operating arm 13 supported radially of the table 11 and vertically movably on a frame, not shown, and a rolling mechanism 14 provided on the lower surface of the operating arm 13. The rolling mechanism 14 comprises a housing 15, a pressing element 18 fitted in the housing 15 and slidable in vertical directions, a compression spring 16 disposed within the housing 15 so as to apply a resilient force to the pressing element 18 and a spherical rolling tool 17 made of a material having a superhigh hardness, such as diamond, titanium carbide or tungusten carbide, and rotatably mounted on the pressing element 18 at the point thereof.

The rolling head 12 is lowered until the rolling tool 17 disposed at the lowermost position of the rolling head 12 comes in contact with the flat annular surface 21 of the front wall portion 2. Then, the rolling head 12 is pressed downward so that the rolling tool 17 disposed at the lowermost position on the rolling mechanism 14 is pressed against the front wall portion 2 and simultaneously is reciprocated radially of the rotary table 11 within a predetermined distance by means of a mechanism, not shown. During the rolling process, the rotary table 11 is rotated about the axis at a low revolving rate.

The pressing force of the mechanism pressing the rolling head 12 and the force of the spring 16 is applied in the direction of thickness of the front wall portion 2 through the rolling tool 17 to the surface of the flat annular surface 21 formed on the front wall portion 2 of the front cover 1, whereby the rolled surface is subjected to plastic deformation and thus the flatness of the surface is improved, the metallographic compactness of the surface is increased, the hardness of the surface is increased and the thickness of the rolled part is decreased.

When the area of rolling processing by means of the rolling tool 17 is expanded into a part of the connecting portion 9 formed by press forming process, the outside diameter $D_2$ of the flat annular surface 21A formed by means of the rolling tool 17 becomes greater than the outside diameter $D_1$ of the friction surface 21 formed by press forming process. Furthermore, although the radius of curvature of the curved inner surface of the boundary portion 9A between the flat annular surface 21A and the connecting portion 9 is reduced, the strength of the boundary portion 9A is increased, since the metallographic compactness and the hardness of the boundary portion 9A is increased.

In the rolling head 12' shown on the rightside in FIG. 2, the rolling tool 17' of the rolling mechanism 14' is formed in the shape of a roller and the housing 15' and the pressing element 18' are modified so as to be adaptable to the shape of the rolling tool 17'. The use of the rolling head 12' reduces the distance of reciprocation of the operating arm 13.

The single point rolling is a method of increasing the metallographic compactness and the hardness and improving the flatness of a surface of a metal plate causing plastic deformation of the surface by pressing with a predetermined pressure and rolling a rolling tool on the surface of a metal plate. This method is capable of providing an effect which is comparable with an effect which is caused by a process commonly called as coining effect.

The front cover finished by the single point rolling process has the same outside diameter, a flat annular surface 21A of an increased diameter and of an improved flatness as compared with a front cover which has been formed by press forming and has not been subjected to further processing. Accordingly, the front cover having the flat annular surface 21A of an increased outside diameter is capable of providing a wider frictional surface for the direct-coupling clutch incorporated into a torque converter. The radius of curvature of the boundary portion 9A of the connecting portion 9 lying next to the periphery of the flat annular surface 21A is reduced, however, the durability and the reliability of the front cover will not be reduced, since the metallographic compactness and the strength of the boundary portion 9A are increased.

It is obvious from what has been described hereinbefore that in the single point rolling process according to the method of the present invention, a front cover may be fixedly positioned on a fixed table and the operating arm may be turned over the fixed table instead of turning the front cover together with the rotary table as described referring to FIG. 2.

It will thus be understood that the objects set forth above, among those made apparent from the preceding description, are efficiently attained and, as this invention may be embodied in several forms without departing from the spirit and the scope of the invention, it is intended that all matter contained in the above description or shown in the accompanying drawings shall be illustrative and not in the limiting sense.

It is also to be understood that the appended claims are intended to cover all of the generic and the specific features of the invention herein described and all statements of the scope of the invention which, as a matter of language, might be said to fall therebetween.

What is claimed is:

1. A front cover for a torque converter comprising:
   a front wall portion to be connected coaxially to an output shaft of an engine press-formed from a metal plate;
   a connecting portion press-formed from said metal plate integrally with said front wall portion extending from an outside periphery thereof and having a predetermined radius of curvature in cross section;
   a cylindrical peripheral portion press-formed from said metal plate integrally with said front wall portion and connecting portion extending from an outside periphery of said connecting portion at a predetermined angle with respect to said front wall portion;
   a flat annular surface formed on an inside surface of said front wall portion and a boundary portion connecting an outside periphery of said flat annular surface to an inside periphery of said connecting portion at an inside surface thereof having a smaller radius of curvature in cross section than that of said connecting portion; said flat annular surface and inner surface of said boundary portion having increased hardness and more compact metallographic structure in the surface thereof and a reduced thickness thereof in comparison with rest of the part of said front wall portion.

2. A method of processing a front cover for a torque converter, comprising the steps of:
   press forming a front cover blank from a single metal plate having, integrally, a front wall portion of a disk-shape, a connecting portion extending from a periphery of said front wall portion and having a predetermined radius of curvature in cross section and a cylindrical peripheral portion extending from said connecting portion at a predetermined angle with respect to said front wall portion; and
   forming a flat annular surface on an inside surface of said front cover blank by rolling a rolling tool made of a material having high hardness on a peripheral area of said front wall portion and a part of said connecting portion next to the peripheral area of said front wall portion with a predetermined pressure applied to said rolling tool in the direction of the thickness of said front wall portion and reciprocating movements of said rolling tool radially of said front wall portion while said front cover blank is rotated about the center axis of said front wall portion.

* * * * *